Patented Jan. 2, 1945

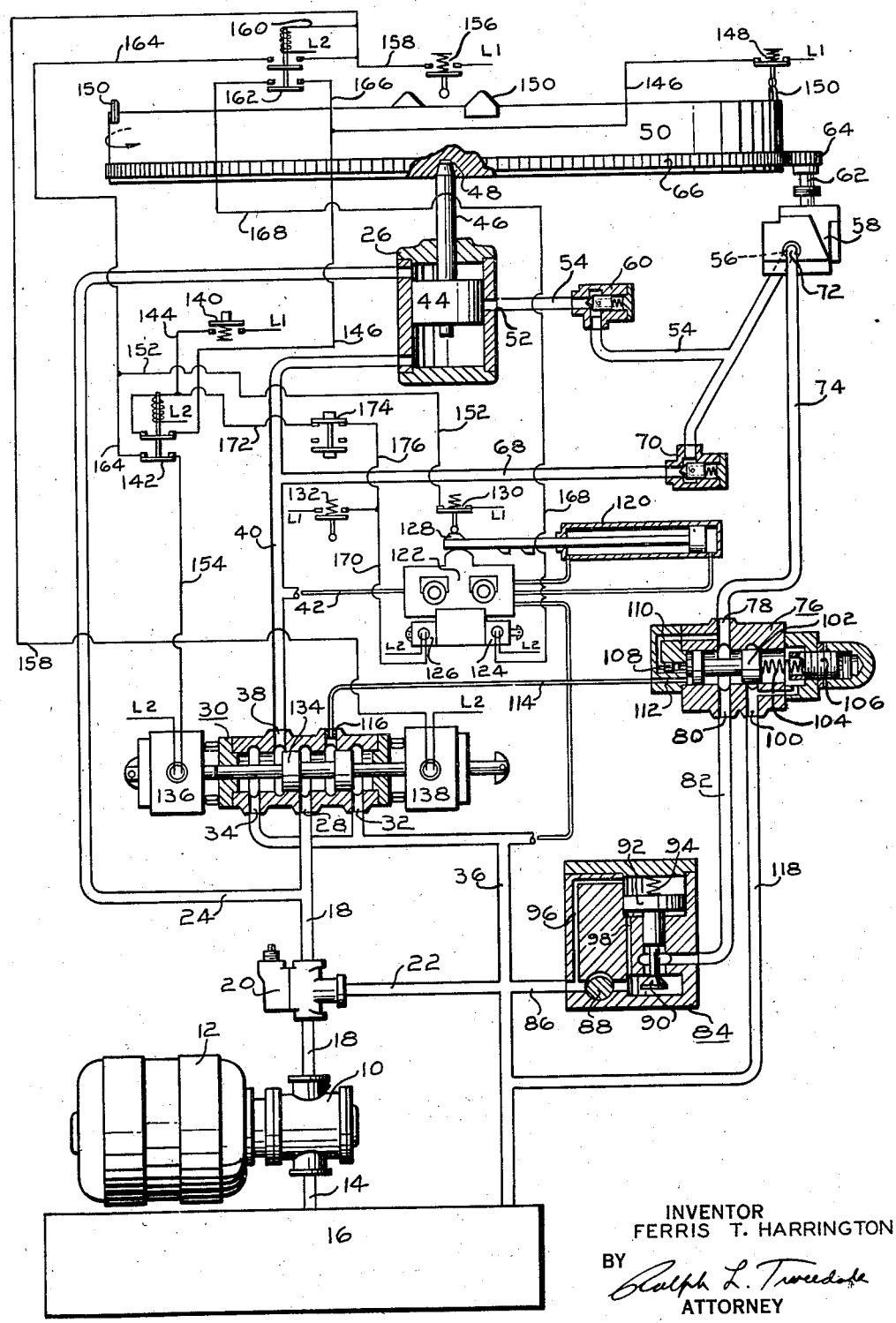

2,366,398

UNITED STATES PATENT OFFICE 2,366,398

POWER TRANSMISSION

Ferris T. Harrington, Detroit, Mich., assignor to Vickers Incorporated, Detroit, Mich., a corporation of Michigan Application March 22, 1940, Serial No. 325,276

10 Claims. (Cl. 60—53)

This invention relates to power transmissions, particularly to those of the type comprising two or more fluid pressure energy translating devices one of which may function as a pump and another as a fluid motor.

The invention is more particularly concerned with a power transmission system adapted for operation of an indexing device such as is commonly used with machine tools where it is desired to index a work support or other shiftable member into any one of a plurality of predetermined positions in sequence.

It is an object of the present invention to provide a hydraulic power transmission system having a hydraulic motor for operating an indexable member together with improved mechanism for operating a shiftable positioning pin in interlocked sequence with the operation of the hydraulic motor.

A further object is to provide an improved system of this character wherein an indexable member is automatically decelerated at the end of each indexing movement together with improved means for causing such deceleration.

A further object is to provide an interlocking control system between an indexable member and some other work device such as a machine tool slide whereby a predetermined sequential operation of each is secured.

Further objects and advantages of the present invention will be apparent from the following description, reference being had to the accompanying drawing wherein a preferred form of the invention is clearly shown.

In the drawing the single figure is a diagrammatic view of a power transmission system incorporating a preferred form of the present invention.

Referring now to the drawing, there is shown a pump 10 adapted to be driven by a suitable prime mover, such as an electric motor 12. The pump 10 has a suction conduit 14 adapted to withdraw fluid from a tank 16 which is delivered through a delivery conduit 18. The latter has a conventional relief valve 20 incorporated therein for the purpose of bypassing to tank through a conduit 22 the fluid delivered by the pump whenever a predetermined pressure is exceeded in the delivery conduit 18.

The conduit 18 has a branch 24 which forms a continuously open connection to the rod end of a positioning pin actuating cylinder 26. The conduit 18 also extends to the pressure port 28 of a solenoid-actuated, four-way valve 30. The latter has tank ports 32 and 34 which connect with the tank 16 by conduit 36. One of the motor ports 38 of valve 30 connects by a conduit 40 with the head end of the cylinder 26. The conduit 40 has a branch 42 which may be connected with some other work circuit later to be described.

The cylinder 26 carries slidably mounted therein a piston 44 having a rod 46 which constitutes the usual positioning pin or locking pin customarily provided with indexing tables as utilized in the machine tool art. When in the position illustrated, the pin 46 engages in one of a plurality of recesses 48 in the underside of a rotatable table 50 which constitutes the member to be indexed. There are, of course, as many recesses 48 as there are stations to which the member 50 is desired to be indexed.

The side wall of the cylinder 26 is provided with a port 52 which is so positioned as to open into the rod end of the cylinder 26 whenever the piston 44 has moved fully downwardly and has retracted the pin 46 from the notch 48. The port 52 connects by a conduit 54 with the inlet port 56 of a rotary fluid motor 58. A check valve 60 is incorporated in the conduit 54 for free flow from the port 52 to the port 56. The driving shaft 62 of the motor 58 carries a pinion 64 meshing with a large ring gear 66 secured to the rotary table 50. A branch supply conduit 68 extends from the delivery conduit 40 through a check valve 70 to the conduit 54 beyond the check valve 60.

The motor 58 has an outlet port 72 which connects by a conduit 74 with a pressure-responsive valve 76 entering the same at a port 78. A port 80 of the valve 76 which is always in communication with the port 78 extends by a conduit 82 to the inlet port of a hydrostatic flow-controlling valve 84. The outlet port of the latter is connected to the tank conduit 36 by a branch conduit 86. The valve 84 comprises a fixed but adjustable throttle 88 together with a hydrostatic flow-regulating valve 90 arranged in series between the inlet and outlet ports of the valve. The valve 90 is regulated by means of a piston 92 and spring 94 to maintain a constant pressure drop across the throttle 88. For this purpose the top side of the piston connects by a conduit 96 with the outlet side of the orifice 88 while the lower side of the piston 92 connects with the inlet side of the orifice 88 by a conduit 98. The action is such that the rate of flow through the valve as a whole is maintained constant for any setting of the throttle 88 and independently of the pressure in the conduit 82.

The valve 76 is provided with a third port 100 which is normally closed off from the ports 78 and 80 by means of a slidable spool valve 102. The latter is normally urged to the left by a spring 104 adjustable by means of a screw 106. The spool 102 is in hydraulic balance with respect to the pressure in ports 78 and 80. A small piston 108 is provided at the lefthand end of the valve and has its left end in communication with the port 78 through a branch conduit 110. The action is such that whenever a predetermined pressure is exceeded in the port 78 the spool 102 will be shifted to the right against the force of spring 104 to connect port 100 with ports 78 and 80.

The valve 76 is further provided with a connection 112 communicating with the space at the lefthand end of the spool 102. This connection communicates by means of a conduit 114 with the valve port 116 of four-way valve 30. Thus, whenever pressure is admitted to the conduit 114 the fluid reacts over the entire lefthand area of the spool 102 overcoming the force of spring 104 and shifting the spool 102 to the right. The port 100 of valve 76 is connected to tank by a branch conduit 118.

The pump 10 may be utilized for supplying operating fluid to a separate work circuit through the branch 42. Such a circuit may comprise a cylinder-and-piston motor 120 for actuating a machine tool slide in advancing and returning strokes. The supply of fluid to the motor 120 may be controlled by a panel 122 of conventional form adapted to be operated by solenoids 124 and 126. The former, when energized, may cause the motor 120 to perform an advancing stroke, and the latter, when energized, may cause it to perform a returning stroke. The movable element of motor 120 may carry a cam 128 for actuating limit switches 130 and 132 at the respective ends of its stroke. Since the details of the separate work circuit are well known in the art and by themselves form no part of the present invention, no further description thereof will be given.

The four-way valve 30 has a shiftable spool 134 which is shifted to the position illustrated whenever a solenoid 136 is energized. The spool remains in this position until it has been shifted back to the left by energization of a solenoid 138. Suitable detent mechanism, not illustrated, may be supplied for retaining the spool in its shifted position at either end of its movement.

For the purpose of controlling the energization of solenoids 124, 126, 136 and 138, an electric control circuit is provided as follows: A momentary-contact, push-button, starting switch 140 is connected between one side of a suitable supply line L¹ and the coil of a holding relay 142 by a conductor 144. The latter has holding contacts which connect by means of a conductor 146 with a limit switch 148 having its other side connected to the line L¹. The switch 148 is normally open and adapted to be closed by one of a plurality of cams 150 positioned on the indexing table 50. The cams 150 are arranged to close the limit switch 148 when the table 50 comes to rest in each one of its predetermined positions.

The relay 142 has its controlled contacts connected in a circuit which extends from line L¹ through limit switch 130, and by a conductor 152 and a conductor 154 to the solenoid 136, the other side of which is connected to line L². Thus, the solenoid 136 is energized by this circuit whenever both limit switch 130 and relay 142 are closed.

A second limit switch 156 is mounted adjacent the table 50 and is so positioned as to be closed by the passage of each of the cams 150 at an instant slightly before the table 50 comes to its predetermined position. Limit switch 156 has one side connected to line L¹ and its other side connected by a conductor 158 to the solenoid 138, the other side of which is connected to line L². A branch conductor 160 extends from the conductor 158 to the operating coil of a holding relay 162. The holding circuit of the latter extends by a conductor 164 to the conductor 152 so that the relay 162 will remain closed so long as the limit switch 130 remains closed. The controlled contacts of the relay 162 are in a circuit extending from conductor 146, which is under the control of limit switch 148, by a conductor 166 and a conductor 168 to the solenoid 124 of panel 122.

The limit switch 132 is connected between line L¹ and a conductor 170 extending to the solenoid 126. A branch conductor 172 extends from conductor 144 to a snap-acting, manually-controlled, off-on switch 174, the other side of which is connected by a conductor 176 to the conductor 170.

In operation, assuming the motor 12 to be driving the pump 10 and that the motor 120 has just completed a return stroke to close the limit switch 130 and that the switch 174 is in the position shown on the drawing, the solenoid 136 will have been energized by switch 130 through the circuit 152, conductor 164, relay 142, and conductor 154. The relay 142 will be in its closed position by reason of having been previously energized when the motor 120 completed the end of its advancing movement and closed limit switch 132. This energized the coil of relay 142 through conductor 176, switch 174 and conductor 172. When the relay 142 closed it established its own holding circuit through the conductor 146 and limit switch 148 which would not have opened during the return movement of the motor 120.

Thus when the limit switch 130 is closed at the end of its return movement the solenoid 136 is energized to shift the spool 134 to the right and all the parts will lie in the position illustrated on the drawing. The full pump delivery is now directed through branch delivery conduit 24 to the rod end of cylinder 26 forcing the piston 44 downwardly and causing the oil to discharge from the head end of cylinder 26 through conduit 40, port 38 and port 34 of valve 30, and conduit 36 to the tank. At the same time pressure oil is admitted through port 116 and conduit 114 through connection 112 of valve 76 thus shifting the spool 102 to the right and opening port 100 to free communication with port 78.

Accordingly, as soon as piston 44 has completely moved downwardly and retracted the locking pin 46, the port 52 opens admitting the pump delivery to the conduit 54 where it flows through check valve 60 to the inlet port 56 of motor 58. The latter rotates driving the table 50 and discharges oil from the outlet port 72 through conduit 74, ports 78 and 100 of valve 76, and conduit 118 to the tank 16. The motor 58 accordingly rotates at full speed determined by the relative displacement of pump 10 and motor 58, thus rotating the table 50 until such time as the next cam 150 contacts the limit switch 156.

In the meantime, however, the cam 150 which was underneath limit switch 148 rides out from under it thus opening the holding circuit of relay 142 permitting the latter to drop and deenergizing solenoid 136. Accordingly, when the limit switch 156 closes, a circuit is established from line L¹ by conductor 158 directly to the solenoid 138 thus causing the spool 134 to shift to the left connecting port 116 to tank port 32 and connecting port 38 to the pressure port 28. This exhausts the left end of valve 76 permitting the spool 102 to shift to the left and would, but for the piston 108, cause the entire motor discharge coming through conduit 74 to pass to tank through the flow-controlling valve 84. This would create sudden change in speed of the motor 58 which is avoided by the action of piston 108 which makes the valve 76 act as a relief valve so that the pressure in conduits 74 and 82 can never rise beyond a predetermined value during this action of deceleration. Accordingly, until a large portion of the potential energy in the mass of the table 50 is dissipated, the valve 76 acts as a relief valve bypassing whatever quantity is necessary from the conduit 74 to the tank through port 100 and conduit 118. In this way a predetermined braking effect is provided on the fluid motor 58 until such time as the inertia of the table 50 has been absorbed. Thereafter, the motor 58 continues to rotate at a speed determined by the setting of the throttle 88 in valve 84.

It will be noted that during this decelerating action of motor 58 the inlet thereof is connected to the pump delivery line 18 through port 28 and port 38 of valve 30, and through conduit 40 and branch delivery conduit 68, the check valve 70 permitting free flow to the motor 58 by this path. It will also be noted that check valve 60 prevents back flow toward the port 52 in cylinder 26.

The shifting of the valve 30 also directed the pump delivery through conduit 40 to the head end of cylinder 26 where, due to the greater area, this pressure oil is able to shift the piston 44 upwardly against the corresponding pressure exerted in the top end of cylinder 26 over the smaller top area of piston 44. During the deceleration and slow speed operation of motor 58, the latter will not utilize the full delivery of pump 10. A portion of the excess delivery is utilized to operate the piston 44, and any remainder is bypassed to tank by relief valve 20. Thus the shifting of valve 30 accomplished two functions; first, it provided for deceleration of the motor 58, and secondly, it caused the locking pin 46 to begin its movement toward the next recess 48 in the table 50. The locking pin 46 will accordingly be pressed into the recess 48 at the same time that the recess comes into position overlying the same.

The closure of limit switch 156 performs still a third function in energizing the relay 162 through conductors 158 and 160. As the relay 162 picks up it establishes its holding circuit through conductor 164 and conductor 152 to the limit switch 130 which at this time is closed by reason of the motor 120 lying in its fully returned position. Relay 162 accordingly stays up and establishes connection between conductors 166 and 158, which conductors are not made alive at the present time, however, due to the open gap at limit switch 148. A short distance after the cam 150 passes under the limit switch 156, which distance is great enough to permit deceleration of table 50, another cam 150 contacts the limit switch 148 thus closing this gap and energizing the solenoid 124 of the panel 122 to cause the motor 120 to perform an advancing stroke. The locking pin 46 retains the table 50 in its indexed position during this movement of motor 120. As soon as motor 120 starts to the left, limit switch 130 opens to break the holding circuit for relay 162 whereby it drops so that the circuit to solenoid 124 is broken.

As was explained heretofore, when the motor completes its advancing stroke switch 132 is contacted energizing solenoid 126 to reverse motor 120 and also causing the relay 142 to pick up in preparation for initiation of another indexing cycle when the motor 120 has again returned and closed limit switch 130 as previously described. After motor 120 starts to the right, switch 132 will open, but, due to the fact that switch 148 is closed, the holding circuit for relay 142 is closed so that, as soon as motor 120 closes switch 130, solenoid 136 will be energized. The system thus repeats its cycles of movement, first, of the indexing table 50, and then, of the auxiliary work circuit for the motor 120, so long as the switch 174 remains in the position illustrated.

When it is desired to stop the machine, the switch 174 may be opened, thus preventing energization of the relay 142 as the motor 120 completes its advancing stroke. Accordingly, when it completes its return stroke, the solenoid 136 will not be energized, and the machine will come to rest. In order to again start the machine on repeating cycles it is necessary to close the switch 174 and thereafter to depress the starting switch 140 in order to pick up the relay 142. If it is desired to start the machine through a single cycle only the switch 174 may be left open, and then when switch 140 is momentarily closed the same cycle of movements will take place except that relay 142 will not be picked up at the end of the forward stroke of motor 120. Accordingly the machine will come to rest when motor 120 returns to the position illustrated.

While the form of embodiment of the invention as herein disclosed constitutes a preferred form, it is to be understood that other forms might be adopted, all coming within the scope of the claims which follow.

What is claimed is as follows:

1. In a hydraulic power transmission system for indexing a member to a plurality of predetermined stations in sequence the combination of a source of pressure fluid, a fluid motor connected to drive the member, supply and return connections between the motor and the source, a lock bolt for locking the member in any station, means for shifting the lock bolt between locking and releasing position, valve means for initiating the supply of fluid to the motor, a valve in the return conduit for restricting the flow of fluid exhausting from the motor, valve means for freely bypassing the restricting valve during a portion of an indexing cycle whereby when the bypassing valve is closed the restricting valve will decelerate the motor, and means for limiting to a predetermined value the pressure between the motor and the restricting valve during the decelerating periods.

2. A hydraulic power transmission system for driving a member having a large degree of inertia comprising in combination with a source of pressure fluid, a fluid motor connected to drive the member, supply and return conduits between the motor and the source, valve means for initiating the supply of fluid to the motor, a hydrostatic flow-controlling valve in the return conduit for restricting the flow of fluid exhausting from the motor to a predetermined rate independently of exhaust pressure, valve means for freely bypassing the restricting valve to operate the motor at full speed, and means for limiting to a predetermined value the pressure between the motor and the restricting valve during times while the bypass valve is not freely bypassing the restricting valve whereby the motor may be decelerated after full speed operation, said bypassing valve and said pressure limiting means constituting a single valve having a single shiftable flow controlling member.

3. A hydraulic power transmission system for driving a member having a large degree of inertia comprising in combination with a source of pressure fluid, a fluid motor connected to drive the member, supply and return conduits between the motor and the source, valve means for initiating the supply of fluid to the motor, a hydrostatic flow-controlling valve in the return conduit for restricting the flow of fluid exhausting from the motor to a predetermined rate independently of exhaust pressure, valve means for freely bypassing the restricting valve to operate the motor at full speed, means for limiting to a predetermined value the pressure between the motor and the restricting valve during times while the bypass valve is not freely bypassing the restricting valve whereby the motor may be decelerated after full speed operation, said bypassing valve and said pressure limiting means constituting a single valve having a single shiftable flow-controlling member and having two pilot-operating chambers for shifting the flow-controlling member, means connecting one chamber to the supply conduit, and means connecting the other chamber to the return conduit.

4. A hydraulic power transmission system for driving a member having a large degree of inertia comprising in combination with a source of pressure fluid, a fluid motor connected to drive the member, supply and return conduits between the motor and the source, valve means for initiating the supply of fluid to the motor, a hydrostatic flow-controlling valve in the return conduit for restricting the flow of fluid exhausting from the motor to a predetermined rate independently of exhaust pressure, valve means for freely bypassing the restricting valve to operate the motor at full speed, and means for limiting to a predetermined value the pressure between the motor and the restricting valve during times while the bypass valve is not freely bypassing the restricting valve whereby the motor may be decelerated after full speed operation.

5. In a hydraulic power transmission system for indexing a member to a plurality of predetermined stations in sequence the combination of a source of pressure fluid, a fluid motor connected to drive the member, supply and return connections between the motor and the source, a lock bolt for locking the member in any station, hydraulic means including a cylinder and piston for shifting the lock bolt between locking and releasing position, said motor being connected to receive fluid from the supply conduit only after such fluid has passed through said hydraulic means for one direction of bolt shifting, means for blocking flow from the hydraulic means to the motor and controlled by a predetermined travel of the bolt to permit such flow when the bolt is completely shifted in said one direction, and means connecting the motor and hydraulic means in parallel for the other direction of bolt shifting.

6. In a hydraulic power transmission system for indexing a member to a plurality of predetermined stations in sequence the combination of a source of pressure fluid, a fluid motor connected to drive the member, supply and return connections between the motor and the source, a lock bolt for locking the member in any station, hydraulic means including a cylinder and piston for shifting the lock bolt between locking and releasing position, said motor being connected to receive fluid from the supply conduit only after such fluid has passed through said hydraulic means for one direction of bolt shifting, means for blocking flow from the hydraulic means to the motor and controlled by a predetermined travel of the bolt to permit such flow when the bolt is completely shifted in said one direction, a check valve between the hydraulic means and the motor arranged to permit flow toward the motor, and means connecting the motor and hydraulic means in parallel for the other direction of bolt shifting.

7. In a hydraulic power transmission system for indexing a member to a plurality of predetermined stations in sequence the combination of a source of pressure fluid, a fluid motor connected to drive the member, supply and return connections between the motor and the source, a lock bolt for locking the member in any station, hydraulic means including a cylinder and piston for shifting the lock bolt between locking and releasing position, said motor being connected to receive fluid from the supply conduit only after such fluid has passed through said hydraulic means for one direction of bolt shifting, means for blocking flow from the hydraulic means to the motor and controlled by a predetermined travel of the bolt to permit such flow when the bolt is completely shifted in said one direction, means connecting the motor and hydraulic means in parallel for the other direction of bolt shifting, and a check valve in said connecting means opening to permit flow toward the motor.

8. A hydraulic power transmission system for indexing a member to a plurality of predetermined stations in sequence comprising in combination with a source of pressure fluid, a fluid motor connected to drive the member, supply and return connections between the motor and the source, a lock bolt for locking the member in any station, a differential area cylinder and piston device for shifting the lock bolt and having its smaller area connected to the supply conduit to the motor, valve means responsive to retraction of the bolt for opening the supply conduit to flow to the motor, a branch supply conduit extending to the motor independently of said valve means, and having a connection to the larger area of said device, a selectively shiftable valve arranged to connect the branch supply conduit either to the first-mentioned supply conduit or to exhaust the same, and means responsive to shifting of the last-mentioned valve for concurrently restricting the return conduit from the motor while the branch supply conduit is connected to the first-mentioned supply conduit.

9. A hydraulic power transmission system for indexing a member to a plurality of predetermined stations in sequence comprising in combination with a source of pressure fluid, a fluid motor connected to drive the member, supply and return connections between the motor and the source, a lock bolt for locking the member in any station, a differential area cylinder and piston device for shifting the lock bolt and having its smaller area connected to the supply conduit to the motor, valve means responsive to retraction of the bolt for opening the supply conduit to flow to the motor, a branch supply conduit extending to the motor independently of said valve means, and having a connection to the larger area of said device, a selectively shiftable valve arranged to connect the branch supply conduit either to the first-mentioned supply conduit or to exhaust the same, check valves in each supply conduit to prevent back flow from the motor, and means responsive to shifting of the last-mentioned valve for concurrently restricting the return conduit from the motor while the branch supply conduit is connected to the first-mentioned supply conduit.

10. In a hydraulic power transmission system for indexing a member to a plurality of predetermined stations in sequence the combination of a source of pressure fluid, a fluid motor connected to drive the member, supply and return connections between the motor and the source, a lock bolt for locking the member in any station, means for shifting the lock bolt between locking and releasing position, valve means for controlling the initiation of the supply of fluid to the motor, electrical operating means for said valve, a holding relay for energizing said electrical means, and a holding circuit for said relay including switch means held closed while the lock bolt is being released for maintaining energization of the electrical means until fully released.

FERRIS T. HARRINGTON.